US005700111A

United States Patent [19]

Johnson et al.

[11] Patent Number: 5,700,111

[45] Date of Patent: Dec. 23, 1997

[54] APPARATUS FOR APPLYING SYNTHETIC ROVING MATERIALS AND METHOD FOR CONTROLLING THE BUILD UP OF STATIC ELECTRICITY

[75] Inventors: Randall Eugene Johnson, Ringgold; Marcus N. Sparks, Flintstone, both of Ga.

[73] Assignee: Synthetic Industries, Inc., Chickamauga, Ga.

[21] Appl. No.: 590,915

[22] Filed: Jan. 24, 1996

[51] Int. Cl.$^{6}$ .............................. B05B 7/04; C09K 17/04; E02D 17/20

[52] U.S. Cl. .......................... 405/258; 405/263; 111/900; 239/427.3; 239/428

[58] Field of Search ...................................... 405/258, 263; 111/900; 239/407, 427, 427.3, 428, 433, 434

[56] References Cited

U.S. PATENT DOCUMENTS

| | | | |
|---|---|---|---|
| 2,608,792 | 9/1952 | Chater | 43/148 |
| 2,731,770 | 1/1956 | Rhea | 47/58 |
| 2,747,934 | 5/1956 | Fisher | 299/86 |
| 2,955,960 | 10/1960 | Batty et al. | 117/138.8 |
| 3,017,720 | 1/1962 | Busch | 47/58 |
| 3,125,294 | 3/1964 | Lill | 239/77 |
| 3,174,693 | 3/1965 | Weber, Jr. | 239/422 |
| 3,249,307 | 5/1966 | Peeps et al. | 239/428 X |
| 3,251,550 | 5/1966 | Lippert et al. | 239/4 |
| 3,476,318 | 11/1969 | Eckert | 239/10 |
| 3,622,077 | 11/1971 | Wiegand | 239/336 |
| 3,761,071 | 9/1973 | Behn | 270/61 |
| 3,772,070 | 11/1973 | Luckenbach | 117/138.8 |
| 4,438,176 | 3/1984 | Steiner et al. | 428/349 |
| 4,723,710 | 2/1988 | Lucore, II | 239/124 |
| 4,936,711 | 6/1990 | Sasahara | 405/258 X |
| 5,351,890 | 10/1994 | Clements | 239/143 |

FOREIGN PATENT DOCUMENTS

| | | |
|---|---|---|
| 62-286573 | 6/1986 | Japan . |

*Primary Examiner*—Tamara L. Graysay
*Assistant Examiner*—Tara L. Mayo
*Attorney, Agent, or Firm*—Renner, Kenner, Greive, Bobak, Taylor & Weber

[57] ABSTRACT

A cannon (10) for applying synthetic roving materials (12) comprises feeder means (20) for receiving and delivering a plurality of strands of synthetic roving material; a barrel assembly (21) having a discharge opening (46) at one end (42); air chamber assembly (22) interposed between feeder means and the barrel assembly providing air under pressure, the roving material being directed therethrough to combine with the air, whereby the air and the roving material are forcibly expelled from the barrel assembly; a fluid housing (23) around the feeder means and carrying a volume of fluid (93); and means (24) for directing and controlling the passage of the fluid from the fluid housing into the feeder means into contact with the roving material as it passes therethrough. A method of controlling the build-up of static electricity during the application of synthetic fiber roving through an air cannon comprises directing a plurality of strands of synthetic roving material through an air cannon; delivering air at high velocity to the cannon and directing it toward a discharge opening provided by the cannon through which the roving is dispensed; and selectively directing a flow of fluid into contact with at least a portion of the synthetic roving material as it passes through the cannon, whereby the build-up of static electricity is directed toward the discharge opening.

10 Claims, 3 Drawing Sheets

APPARATUS FOR APPLYING SYNTHETIC ROVING MATERIALS AND METHOD FOR CONTROLLING THE BUILD UP OF STATIC ELECTRICITY

TECHNICAL FIELD

This invention is directed to an apparatus for dispensing synthetic fiber roving. More particularly, this invention is directed to an air-powered cannon for dispensing synthetic fiber roving. In addition, this invention is directed to an air cannon providing a component for moistening the fiber roving passing therethrough, which thereby reduces the build-up of static electricity associated with the operation of such cannons. This invention is also directed to a method of reducing the build-up of static electricity in air-powered, hand-held cannons for applying synthetic fibers.

BACKGROUND OF THE INVENTION

To prevent erosion and promote the rapid establishment of vegetation, it is often desirable to apply synthetic material to the landscape. The synthetic material typically includes woven and nonwoven fibers of polypropylene, polyethylene, polyester, fiberglass, nylon or PVC. Commonly, these materials are applied as blankets or matting and rolled out over the landscape. Once the synthetic material has been applied to the landscape, it is typically covered with earth and seeded.

Because the application of large roll out blankets and matting is labor intensive and often wasteful due to the irregular geometries encountered with many landscapes, fiber roving has gained popularity. Fiber roving generally consists of continuous strands of synthetic material, such as fibrillated fine denier polypropylene yarn, or fiberglass, which is distributed across a landscape so as to create an extensive three dimensional entanglement of fibers. The fibers are typically covered by applying a viscous, non-water tackifier, such as an emulsified asphalt overspray, which interlocks or "cross-links" the fibers into a web.

The roving fibers are generally applied to the landscape through an apparatus supplied by numerous spools of synthetic yarn. Commonly, the apparatus is powered by air pressure, which both draws the fiber from the spools and dispenses it across the landscape. The apparatus usually further consists of a tube, through which the fibers are blown, and by which the direction of the fibers is controlled. These apparatus are commonly referred to in the art as cannons. Most cannons are hand held, acquiring air pressure from an on-site air compressor and drawing fiber from various spools usually stationed on a nearby vehicle. Experienced crews of four people can install 5000 to 8000 square yards of fiber roving in a single eight hour work day using such cannons.

Fiber passing through the cannon, creates friction and generates a large amount of static electricity. This is particularly true when the cannon comprises polyvinyl chloride (PVC), which has gained popularity in the industry due to the efficient flow-through capacity experienced as compared to those cannons consisting of metal. Unfortunately, the build-up of static electricity is then typically discharged to the operator handling the cannon. As thousands of miles of fiber are commonly distributed through a cannon in any given day, the static build-up is often great enough to harm the operator. Thus, a need exists to reduce or control the build-up of electrostatic charge in air cannons, as well as the discharge of such electricity to the operator.

It is known in the art to impart antistatic effects upon synthetic materials using various antistatic agents. For example, Batty et al., U.S. Pat. No. 2,955,960 teaches a method whereby synthetic fibers are treated with a condensation product of from one to three mole proportions of a fatty acid with one mole proportion of glycerine previously condensed with from 3 to 40 mole proportions of ethylene oxide. The treatment, which reduces the tendency of the fibers to accumulate a charge of static electricity, is performed by spraying the fibers with an aqueous or organic liquid solution of the condensation product or by immersing the fibers in such solution. Similarly, Luckenbach, U.S. Pat. No. 3,772,070, wets synthetic yarn, prior to dyeing or bulking, with an antistatic agent. Following the application of the antistatic agent, heat is applied to cure the antistatic agent thereon.

It is further known that static electricity can be reduced or eliminated by controlling the humidity level of the surrounding air. For example, it has been found that in laundering and folding clothing, the build up of static electricity on the cotton or synthetic belts of laundry folding machines can be controlled with a sufficient amount of moisture. Pursuant to Behn, U.S. Pat. No. 3,761,071, this is accomplished with one or more spraying heads that spray a mist or fog of moisture beneath the conveyor belts so that a mist or fog of moisture is deposited on the bottom surfaces of the conveyor belts which ultimately contact and support the laundry pieces in the laundry folding machines.

The patent literature, however, does not include a convenient method of reducing or controlling the static build-up associated with the continuous flow of fiber through an air cannon. Particularly, the prior art lacks any such teaching where the fibers and/or cannon employed have been treated with an antistatic agent. Furthermore, the prior art does not teach a method of reducing or controlling such static build-up in air cannons.

The patent literature also does not provide an apparatus that dispenses fiber roving and the like, and at the same time reduces or controls the build-up of static electricity associated with the movement of fiber through the apparatus or cannon. While the prior art has addressed dusting problems associated with the blowing of fibers and powders through spray guns, see for example, Weber, U.S. Pat. No. 3,174,693. This patent teaches a spray gun that wets dry powder or fibrous material prior to spraying to avoid dusting; the spray gun drawing water or other liquids from a water line. Nevertheless, neither Weber nor the existing art has addressed the problem of reducing or controlling the build-up of static electricity and discharge to the operator of such apparatus.

SUMMARY OF INVENTION

It is therefore, an object of the present invention to provide an apparatus for applying synthetic roving material, also referred to as an air cannon.

It is another object of the present invention to provide an air cannon that reduces or controls the build-up of static charges associated with use thereof.

It is yet another object of the present invention to provide structure for an air cannon that directs a fluid to the roving so as to minimize the transfer of static charges to the operator of the cannon.

It is still another object to provide a method for reducing the build-up of static charges associated with dispensing roving fiber through an air cannon.

At least one or more of the foregoing objects, together with the advantages thereof over the known art relating to apparatus for applying synthetic fiber roving, which shall become apparent from the specification which follows, are accomplished by the invention as hereinafter described and claimed.

In general the present invention provides a cannon for applying synthetic roving materials comprising feeder means for receiving and delivering a plurality of strands of synthetic roving material; a barrel assembly having a discharge opening at one end; air chamber assembly first chamber means interposed between feeder means and the barrel assembly providing air under pressure, the roving material being directed therethrough to combine with the air, whereby the air and the roving material are forcibly expelled from the barrel assembly; a fluid housing interposed around the feeder means and carrying a volume of fluid and means for directing and controlling the passage of the fluid from the fluid housing into the feeder means to engage the roving material as it passes therethrough.

The present invention also includes a method of controlling the build-up of static electricity during the application of synthetic fiber roving through an air cannon which comprises directing a plurality of strands of synthetic roving material through an air cannon; delivering air at high velocity to the cannon and directing it toward a discharge opening provided by the cannon through which the roving is dispensed; and selectively directing a flow of fluid into contact with at least a portion of the synthetic roving material as it passes through the cannon, whereby the build-up of static electricity is directed toward the discharge opening.

To acquaint persons skilled in the art most closely related to the present invention, one preferred embodiment of an air cannon that illustrates a best mode now contemplated for putting the invention into practice is described herein by, and with reference to, the annexed drawings that form a part of the specification. The exemplary air cannon is described in detail without attempting to show all of the various forms and modifications in which the invention might be embodied. As such, the embodiment shown and described herein is illustrative, and as will become apparent to those skilled in this art can be modified in numerous ways within the spirit and scope of the invention; the invention being measured by the appended claims and not by the details of the specification.

PREFERRED EMBODIMENT FOR CARRYING OUT THE INVENTION

As stated hereinabove, synthetic fiber roving such as fibrillated polypropylene is applied to various landscapes to protect newly seeded areas from erosion under moderate flow conditions and to promote the establishment of rapid vegetation. Once applied, the thousands of fibrils provided by the fibrillated fibers interlock together, forming an "in-place" mat or web for the control of erosion. Because the roving is fine denier and originates in separate strands, it is able to adapt and conform readily with the soil surface, irrespective of their shape and condition.

The synthetic fibers can be any employed in the art, which typically comprise fiberglass thread and polypropylene yarns. For example, LANDSTRAND® fibers, which are manufactured and sold by Synthetic Industries, Inc., of Chattanooga, Tenn., are continuous strands of fibrillated, fine denier polypropylene yarn. Expansion of the fibrillated fibers as they leave the apparatus results in the construction of a random, cross-linked mat of many continuous polypropylene strands. Once the synthetic material has been applied to the landscape, the synthetic material is typically covered by the application of viscous asphaltic emulsions or grass seed solution sprayed from a hydroseeder. In some applications, the synthetic material is simply applied over a freshly seeded landscape.

The use of an air powered, hand-held apparatus, which draws a series of synthetic yarns supplied by various spools, to dispense those yarns into an entangled mat is known. Essentially air moving at high velocity through the cannon will pull the roving through the apparatus and propel the fibers to the desired location. Use of such an apparatus under certain conditions and geographic locations results in the build-up of static electricity attributed to friction associated with rapidly passing continuous strands of yarn through the apparatus. This is especially true where the apparatus, commonly referred to as a cannon, comprises polyvinyl chloride (PVC) tubing. Cannons comprising PVC tubing have been found to increase the application rate of polypropylene roving. Attendant such use however, there has been experienced a build-up of static charge. Accordingly, the cannon of the present invention has been designed to eliminate the problems experienced by the operator, as will be described next.

Figure 1:
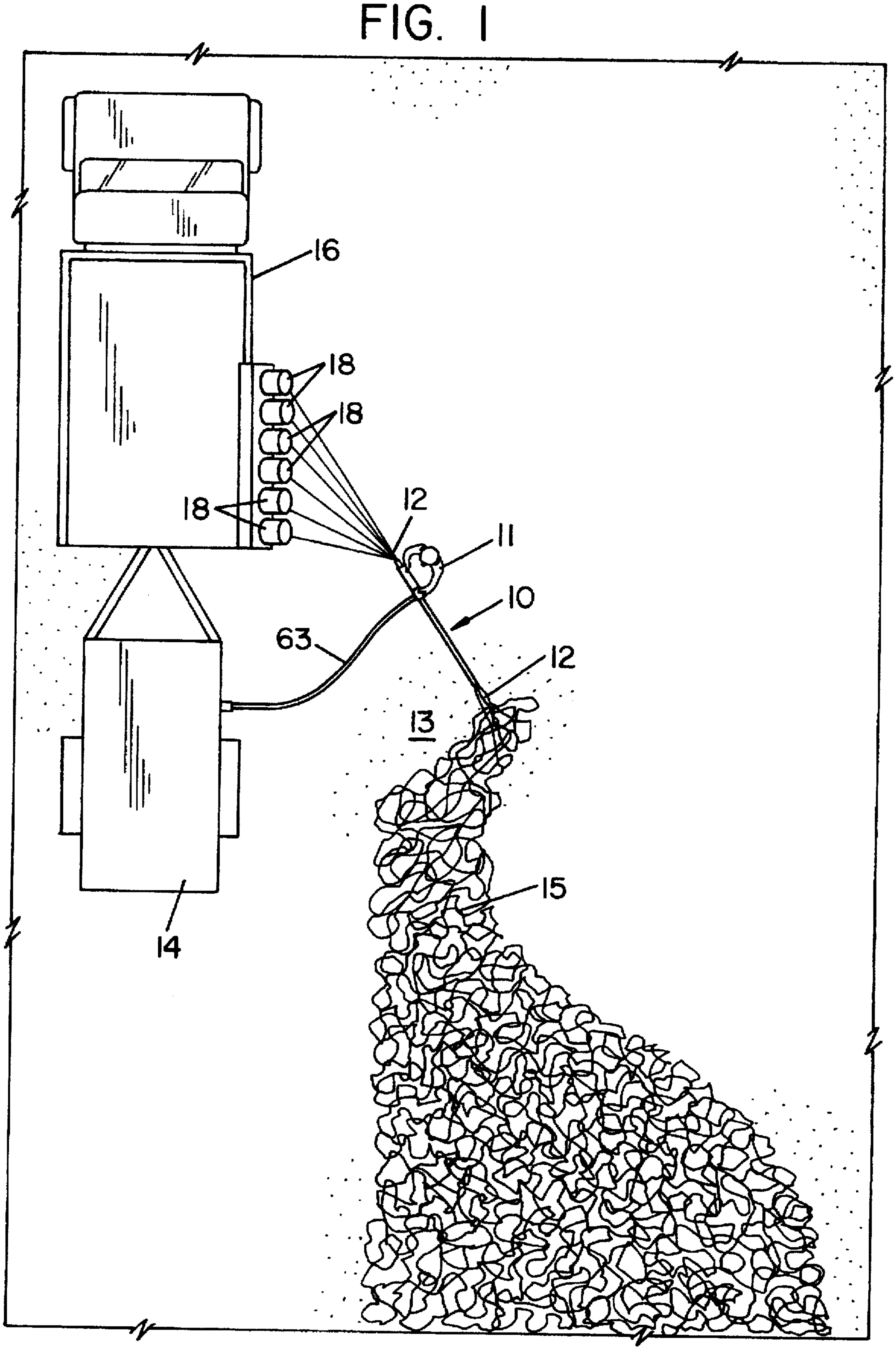
FIG. 1 is a top plan general overall view depicting an operator with a hand-held air cannon, dispensing a plurality of continuous strands of synthetic fiber roving onto a landscape surface.

With reference first to FIG. 1 an air cannon, indicated generally by the numeral 10, in accordance with the present invention, is depicted in use by an operator 11, applying a plurality or tangle of strands of synthetic fiber roving 12, to a sloped area of earth 13, along a highway. The delivery of roving from the cannon 10 is by air moving at high velocity which can typically be supplied in the field by a gasoline powered air compressor 14. Owing to the type of roving and the air pressure, the roving 12 is preferably expelled as a tangled mass of fibers which aids in the delivery and formation of a blanket-like mass of fibers, 15. A suitable supply of roving strands 12 can be carried by a truck 16 or similar movable vehicle and a typical application might well include roving from up to about six spools 18. As a spool is emptied, the tailing strand of roving can be tied to the leading strand of roving from a fresh spool so that the roving strands are essentially continuously feed to the earth area. It will be noted that the operator 11 can vary the area to which the roving is applied by movement of the cannon 10 and also controlling the residence time of the discharge over a particular area. In this manner, wide and narrow areas can readily be accommodated; something that is not possible when using pre-formed mats or blankets of fibers.

Figures 2, 3:
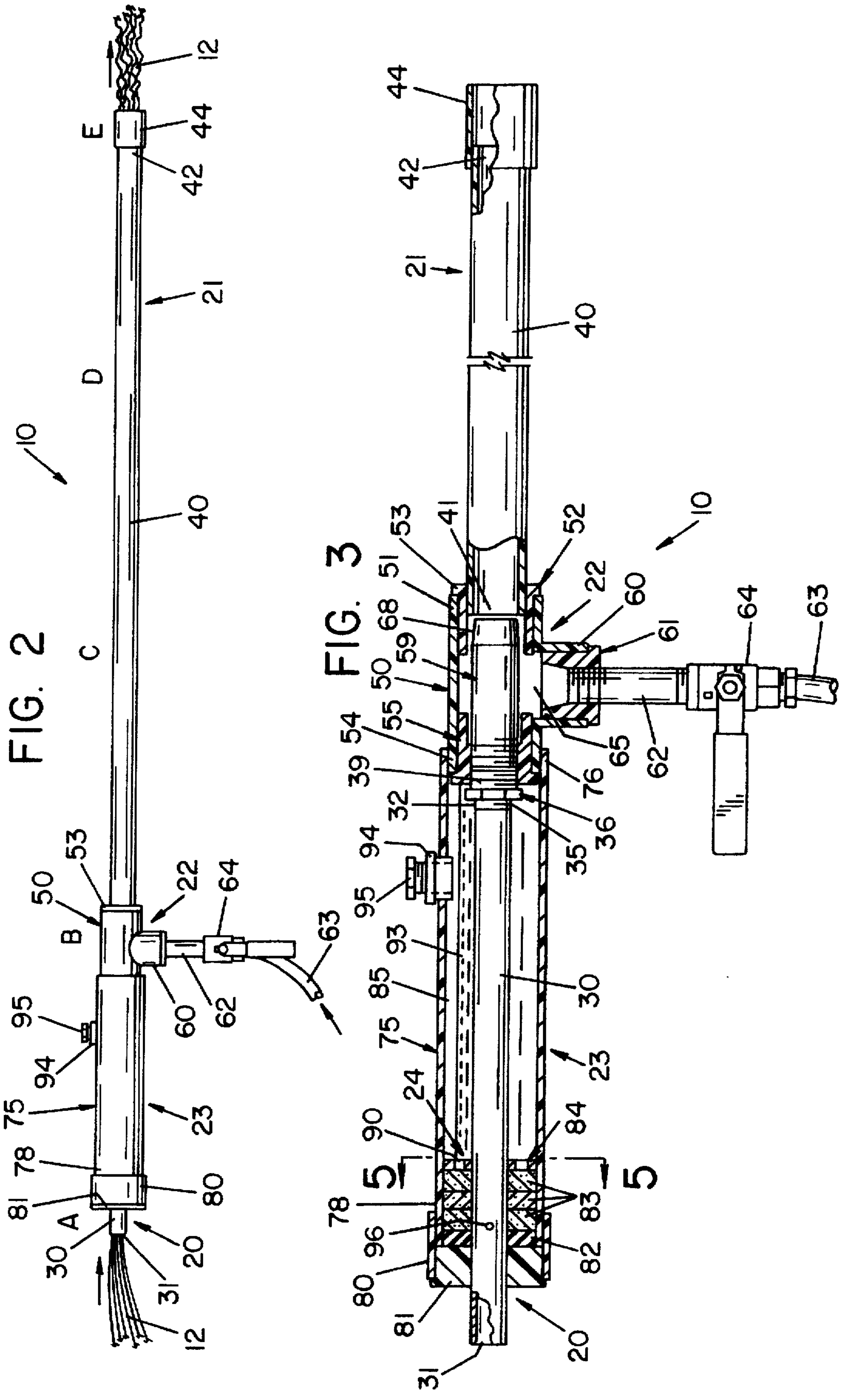
FIG. 2 is a side elevation of an air cannon according to the present invention, depicting the feeding and application of fiber roving.
FIG. 3 is an enlarged side elevation, partially in section, of the air cannon according to the present invention.

The apparatus or cannon 10 is itself described in greater detail with reference to FIGS. 2–5. Referring to FIG. 2, the air cannon 10 generally comprises feeder means, indicated by the numeral 20, for receiving and delivering the strands of roving material 12 to the cannon; a barrel assembly, indicated by the numeral 21, for ejection of the roving material 12; an air chamber assembly, indicated by the numeral 22, providing air under pressure; a fluid housing, indicated by the numeral 23, carrying a volume of fluid; and, means for directing and controlling the passage of the fluid, indicated by the numeral 24, into contact with the roving material.

The feeder means 20 comprises a hollow feeder tube or pipe 30, having an external open end 31 and an internal open end 32. The fiber roving 12 is fed into the external end 31 and then longitudinally through the feeder tube 30 to the internal open end 32. For purposes of the description within this specification, the rear of the air cannon 10 provides the external open end 31. The internal open end 32 is preferably threaded as at 35 and is mated with a threaded coupler 36, having internal and external threads, 38 and 39 respectively, the latter being received by the air chamber assembly 22. Although a specific length, diameter and composition of the pipe is not essential to the invention, in a preferred embodiment the pipe comprises aluminum and is 7/16" in diameter and approximately 13.5 inches long.

The barrel assembly 21 comprises a hollow tube or barrel 40 having an internal open end 41 and external open end 42. Again, for purposes of the description within this specification, the external open end 42 will relate to the front of the air cannon 10. The internal open end 41 of the tube is mated with a bushing 52 of the air chamber assembly 22. The external opening 42 from which fiber roving is expelled from the cannon 10 is fitted with a coupling 44, the inside diameter of which is at least as great as the outside diameter of the tube 40. Provision of the coupling 44 unexpectedly resulted in a greater dissipation of the roving material as compared to merely expelling it directly from the end 42. Although not essential to the operation of the cannon, the tube 40 is typically one inch in diameter and 46 inches in length, and the coupling 44 provides a one inch inside diameter and length of two inches. In a preferred embodiment of the present invention, the barrel assembly 21 comprises PVC.

Figure 4:
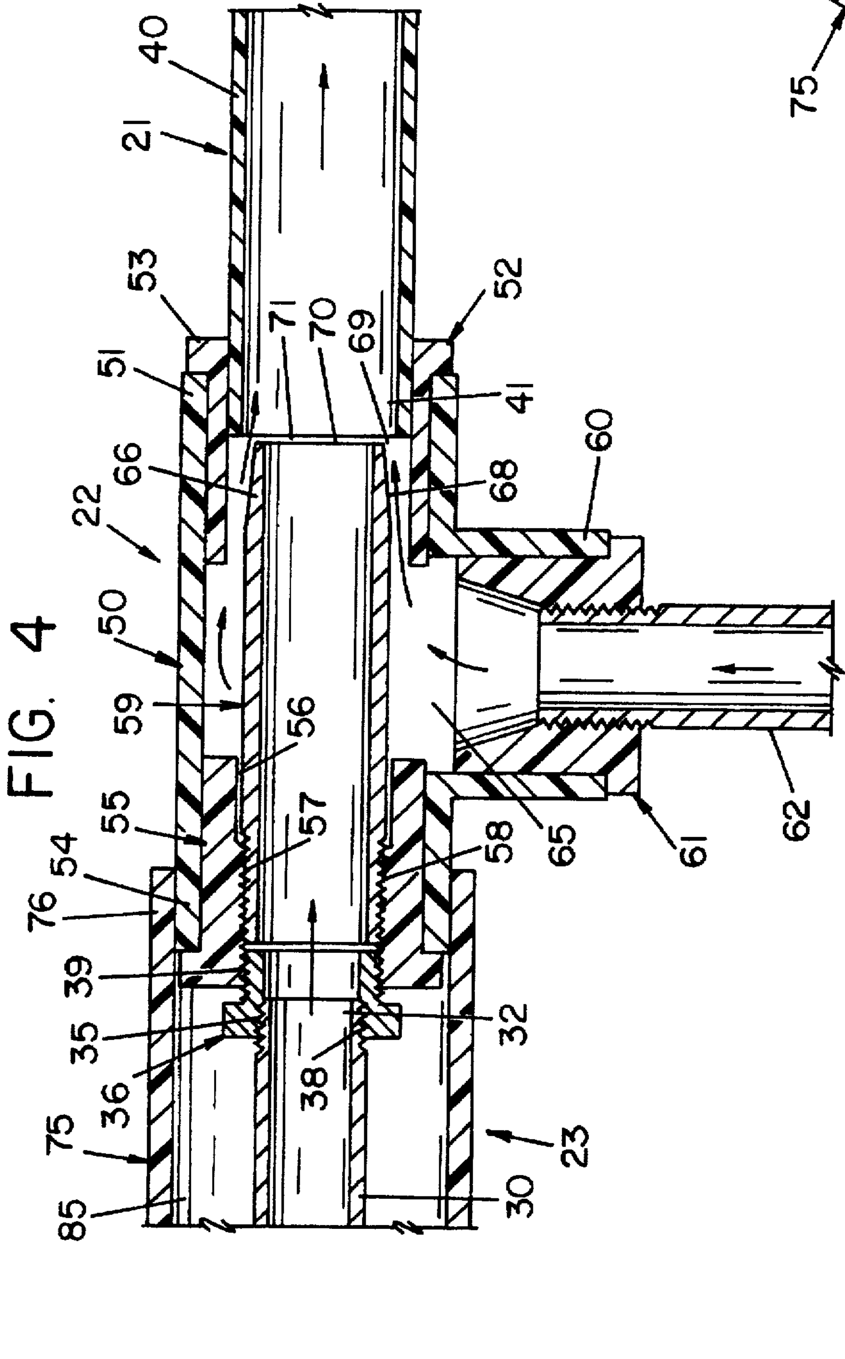
FIG. 4 is a further enlarged side elevation depicting the air chamber assembly of the air cannon according to the present invention.

With respect to FIGS. 3 and 4, the air chamber assembly 22 provides an exterior body or housing member 50, which is T-shaped and can comprise a plumbing Tee. At the forward end 51 of body 50, a cylindrical bushing 52 is suitably mounted. As is apparent from FIG. 4, the outer diameter of the bushing 52 fits within the inner diameter of the body 50, while the outer diameter of the barrel 40 fits within the inner diameter of the bushing 52. The bushing is terminated with an annular flange 53 which abuts against the forward end 51. The body 50, bushing 52 and barrel 40 are affixed together via adhesive to strengthen the cannon, although the components can be fastened together by other means.

At the opposite end 54 of body 50, another cylindrical bushing 55 is suitably mounted. It will be observed that the outer diameter of the bushing 55 also fits within the inner diameter of the body 50, and that the inner diameter 56 of the bushing 55 is partially threaded at 57 to engage the bushing 36 from the roving feeder tube 30. Also carried by the internal threaded portion 57 is the threaded end 58 of a venturi tube 59. While the bushing 55 is affixed to the body 50 via adhesive, the threaded portions allow for the disassembly of the roving feed tube 30 from the air chamber and removal from the cannon, as will be discussed hereinbelow.

The leg 60 of the T-shaped body member 50 is provided with an internally threaded coupling member 61 for receipt of a threaded nipple 62. With reference to FIG. 3, air is fed to the cannon 10 via a suitable conduit 63, through a valve member 64 to join the nipple 62 and flow into the venturi chamber 65, defined within the air chamber housing 22. Typically, the cannon is operated at a pressure of about 125 psig, although pressure is not a limitation of the present invention. It will be noted that air flow within the venturi chamber 65 is blocked rearwardly, i.e., toward the fluid housing 23, and therefore, flows around the venturi tube 59, as depicted by the arrows, and forwardly into the barrel 40. To facilitate this flow, the forward end 66 of venturi tube 59 is chamfered at 68 to provide an annular ring or entrance 69 for passage of the air from the chamber 65 into the barrel 40. It will also be noted that the end 41 of the barrel is located slightly in front of the end 70 of venturi tube 59, creating a gap 71.

The fluid housing 23 provides a supply of fluid or liquid, such as water, which is delivered to the fiber roving 12 passing through the air cannon. The fluid housing 23 comprises a fluid jacket 75, preferably a PVC tube that is about two inches in diameter. The forward end 76 is sealingly affixed to the end 54 of air housing body member 50, the internal diameter of jacket 75 mating with the external diameter of the tube 50. At the opposite end 78, the jacket 75 carries an external coupling member 80 which receives a removable end cap 81, appropriately apertured to allow the roving feeder tube 30 to pass therethrough. Immediately adjacent the end cap 80 is a rubber gasket 82, a plurality of sponge inserts 83 or similar absorptive media and, a fluid flow reducer 84, all of which are apertured to allow the roving feeder tube 30 to pass therethrough. Thus, it is seen that a cavity 85 is formed within the jacket 75 and encircling the tube 30.

Figure 5:
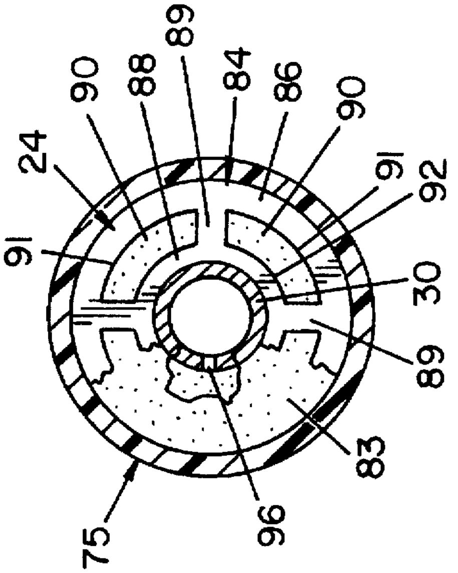
FIG. 5 is a sectional view, taken substantially along the line 5—5 of FIG. 3, depicting the fluid flow reducer member associated with the fluid housing.

With reference to FIG. 5, the reducer 84 comprises a cylindrical disk 86, or other configuration to match the interior of the jacket 75. It carries an inner disk 88, which encircles and supports the roving feeder tube 30, and is supported by a plurality of webs 89. A like plurality of arcuate slots 90 are formed between the radial inner wall 91 of disk 86 and the radial outer wall 92 of disk 88. The slots 90 are provided to allow the fluid carried within the jacket 75 to pass rearwardly and contact the sponge inserts 83.

Prior to operation of the cannon, the jacket 75 is filled with water 93, although it should be recognized that other electrically conductive fluids or liquids serving the goals of this invention to control static electricity could be used. Likewise, the addition of antistatic agents to the fluid is also contemplated. To enable filling, the jacket is provided with an inlet 94 closed by a removable PVC plug 95. The plug 95 typically has a ⅛ inch hole (not shown) drilled through its center to allow a vent for the jacket 75. The fluid 93 readily passes through the reducer 84 during normal handling and motion of the cannon 10, wetting the sponge inserts 83. Once the inserts are sufficiently wetted, their moisture is conveyed to the roving 12 by means of a small aperture 96, on the order of 1/16 inch, which is drilled into the roving feeder tube 30. The aperture 96 is sufficient to allow a controlled amount of the fluid 93 to enter the tube 30 and contact at least some of the fiber roving 12 passing therethrough. Together, the aperture 96, sponge inserts 83 and reducer 84 function to provide the means 24 for directing and controlling the passage of the fluid to the roving 12.

In order to demonstrate the effect of adding fluid to the roving as it is fed through the cannon 10, static measurements were taken at five separate areas (A–E) along the gun. Typical measurements of static electricity were averaging about 80 kV before the addition of liquid, which was more that adequate to provide the operator with uncomfortable shocks. The readings in kV, taken at ten minute intervals during use, have been reported in Table I, hereinbelow. The areas A–E are depicted in FIG. 2.

TABLE I

| | STATIC CHARGE MEASUREMENT (kv) | | | | |
|---|---|---|---|---|---|
| TIME | A | B | C | D | E |
| 7:30 | 0.42 | 0.47 | 0.23 | 6.10 | 28.50 |
| 7:40 | 0.12 | 0.29 | 7.48 | 79.00 | 70.10 |
| 7:50 | 0.52 | 3.59 | 3.20 | 25.80 | 49.10 |
| 8:00 | 0.56 | 0.59 | 57.1 | 56.30 | 47.30 |
| 8:10 | 0.17 | 0.15 | 79.5 | 62.20 | 44.50 |
| 8:20 | 1.69 | 0.15 | 4.91 | 13.00 | 10.34 |
| 8:30 | 0.13 | 0.63 | 29.6 | 48.60 | 48.20 |
| 8:40 | 0.71 | 0.23 | 47.6 | 4.97 | 8.71 |
| 8:50 | 0.13 | 2.37 | 49.1 | 13.80 | 50.90 |

As can be interpreted from the results in Table I, the necessary amount of moisture applied to the fibers traveling through the cannon relocates the static build-up and discharge thereof away from the operator to the end of the cannon, thereby allowing the static charge to be discharged without shocking the operator.

Additional measurements taken over the next several hours for two days of operation were consistent with the results in Table I and no shocks were reported by the operators. Temperature and humidity conditions during the trials were about 85° F. and 15 to 20 percent, respectively for the first day, with greater humidity on the second. Due to the capacity of the jacket 75 and the rate at which water was administered to the roving 12 by means 24, the jacket did not require filling until the second day. The capacity of the jacket tested was about 16 fluid ounces and the amount of roving fed through the cannon 10 was about 50,000 yards, from six strands. It will be appreciated by those skilled in the art that although the rate of water delivery was adequate, the size and capacity of the jacket 75 could be varied to suit the needs of the operator, balancing weight of the cannon 10 with the frequency of refills to replenish the liquid. These can be varied within the scope of the invention disclosed and do not constitute limitations to the practice of the invention.

Thus it should be evident that the cannon and method of the present invention are highly effective in controlling the build-up of static electricity during the application of fiber roving through the air cannon. The invention is particularly suited for such application using compressed air and water as the fluid, but is necessarily limited thereto.

Based upon the foregoing disclosure, it should now be apparent that the use of the cannon described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. A cannon for applying synthetic roving materials comprising:

feeder means for receiving and delivering a plurality of strands of synthetic roving material;

a barrel assembly having a discharge opening at one end;

an air chamber assembly interposed between said feeder means and said barrel assembly providing air under pressure, said roving material being directed therethrough to combine with said air, whereby said air and said roving material are forcibly expelled from said barrel assembly;

a fluid housing interposed around said feeder means and carrying a volume of fluid; and means for directing and controlling the passage of said fluid from said fluid housing into said feeder means into contact with said roving material as it passes therethrough.

2. A cannon for applying synthetic roving materials, as set forth in claim 1, wherein said air chamber assembly comprises an open body member, having opposed first and second open ends and providing an open leg communicating with said body;

a venturi tube mounted within said first open end, and opening into said second end, said tube providing passage for said roving;

a venturi chamber surrounding said venturi tube;

means for sealingly engaging said open leg and conveying air into said chamber; and means for sealing said venturi chamber from said fluid housing and directing air passing therethrough into said barrel assembly.

3. A cannon for applying synthetic roving materials, as set forth in claim 2, wherein said barrel assembly provides a barrel, one end of which is mounted within said second open end of said body member for direct receipt of said roving; said venturi tube tapering at one end adjacent the entry of said barrel assembly and defining a passageway for flow of the air from said venturi chamber around said tube and into said barrel.

4. A cannon for applying synthetic roving materials, as set forth in claim 3, wherein said means for sealing comprises first and second bushings;

said first bushing being interposed between said venturi tube and said first open end;

said second bushing being interposed between said barrel and said second open end.

5. A cannon for applying synthetic roving materials, as set forth in claim 2, wherein said fluid housing comprises a fluid jacket, having opposed first and second ends, and providing a cavity for said fluid, said first end communicating with said air chamber assembly and said second end carrying an end cap providing an aperture for passage of said feeder means therethrough.

6. A cannon for applying synthetic roving materials, as set forth in claim 5, wherein said means for sealing includes first and second bushings;

said first bushing being interposed between said venturi tube and said first open end.

7. A cannon for applying synthetic roving materials, as set forth in claim 6, wherein said feeder means comprises a hollow tube carrying coupler means at one end, said coupler means being engageable with said first bushing to seal fluid within said fluid housing from said air chamber assembly.

8. A cannon for applying synthetic roving materials, as set forth in claim 1, wherein said means for directing and controlling the passage of fluid is carried within said fluid housing and comprises a fluid flow reducer providing an aperture for passage of said feeder means therethrough and at least one opening for the passage of fluid therethrough;

fluid absorptive media positioned downstream of said reducer and surrounding said feeder means; and at least one aperture provided within said feeder means and communicating with said fluid absorptive media.

9. A method of controlling the build-up of static electricity during the application of synthetic fiber roving through an air cannon comprising:

directing a plurality of strands of synthetic roving material through an air cannon;

delivering air at high velocity to an air chamber in said cannon and directing it toward a discharge opening provided by said cannon through which said roving is dispensed; and selectively directing a flow of fluid into contact with at least a portion of the synthetic roving material as it passes through said cannon before the roving material enters the air chamber, whereby the build-up of static electricity is directed toward said discharge opening.

10. A method of controlling the build-up of static electricity during the application of synthetic fiber roving, as set forth in claim 9, wherein said air cannon comprises feeder means for receiving and delivering said plurality of strands;

a barrel assembly providing said discharge opening;

an air chamber assembly interposed between said feeder means and said barrel assembly providing air under pressure, said roving material being directed therethrough to combine with said air, whereby said air and said roving material are forcibly expelled from said barrel assembly;

a fluid housing interposed around said feeder means and carrying a volume of fluid; and means for directing and controlling the passage of said fluid from said fluid housing into said feeder means;

wherein said step of selectively directing a flow of fluid includes the step of introducing an electrically conductive fluid into said fluid housing.

* * * * *